United States Patent [19]

Allen

[11] Patent Number: 4,833,781

[45] Date of Patent: May 30, 1989

[54] ADJUSTABLE DEPTH GAUGE FOR CHAIN SAWS

[75] Inventor: William J. Allen, Goodyear, Ariz.

[73] Assignee: Victor Oxentenko, Phoenix, Ariz.

[21] Appl. No.: 228,504

[22] Filed: Aug. 5, 1988

[51] Int. Cl.⁴ ............................................... B23D 47/02

[52] U.S. Cl. ........................................ 30/377; 30/382; 83/788

[58] Field of Search .......................... 30/371, 377, 382; 83/788

[56] References Cited

U.S. PATENT DOCUMENTS

| | | | |
|---|---|---|---|
| 1,170,120 | 2/1916 | Slonaker | 144/72 |
| 1,690,697 | 11/1928 | Palmu | 144/72 |
| 2,348,612 | 5/1944 | Deacon | 144/73 |
| 2,567,886 | 9/1951 | Mall et al. | 143/32 |
| 2,638,944 | 5/1953 | Woleslagle | 143/32 |
| 2,698,034 | 12/1954 | Jakku | 143/32 |
| 2,708,953 | 5/1955 | Diehl | 143/32 |
| 3,808,684 | 5/1974 | Ludwig | 30/382 |
| 4,063,358 | 12/1977 | Hodge | 30/371 |
| 4,143,460 | 3/1979 | Shean | 30/382 |
| 4,272,889 | 6/1981 | Scott et al. | 30/371 |
| 4,382,334 | 5/1983 | Reynolds | 144/73 |
| 4,615,121 | 10/1986 | Hakansson | 30/382 |

*Primary Examiner*—Frank T. Yost
*Assistant Examiner*—Willmon Fridie, Jr.
*Attorney, Agent, or Firm*—Warren F. B. Lindsley

[57] ABSTRACT

An adjustable movable guard mechanism for a saw bar of a chain saw over which an endless chain travels which guard mechanism having a first part which covers at least a part of the forward end of the contoured plate and a second part which forms a ski for guiding the chain saw along a surface to be cut.

6 Claims, 3 Drawing Sheets

ADJUSTABLE DEPTH GAUGE FOR CHAIN SAWS

BACKGROUND OF THE INVENTION

This invention relates to chain saws and more particularly to an improved adjustable nose guard mechanism therefor which limits the exposure of the nose of the saw bar.

DESCRIPTION OF THE PRIOR ART

Many types of chain saw guards have been provided for protecting the nose and rear side of the chain but none have been known to not only protect the nose and front side of the chain but also to selectively expose more or less of the nose of the saw bar to render it useful for fire fighting purposes.

U.S. Pat. No. 2,708,953 discloses an adjustable bumper for chain saws which is attached by a bolt that extends through a slot in the blade of the saw.

U.S. Pat. No. 4,063,358 discloses a guard for a chain saw which covers substantially all of the saw except its tip or nose. The guard limits the extent that the tip of the saw may be exposed.

Other patents of interest relating to guards for chain saws are listed below:

U.S. Pat. No. 2,567,886
U.S. Pat. No. 2,638,944
U.S. Pat. No. 2,698,034
U.S. Pat. No. 4,143,460
U.S. Pat. No. 4,272,889

None of these references disclose the particular nose guard disclosed and claimed herein which selectively limits the exposure of the down side portion of the nose of the chain saw while protecting the top portion adjacent its nose.

SUMMARY OF THE INVENTION

In accordance with the invention claimed, a new and improved guard for a chain saw is disclosed which protects the nose and top of its saw bar in such a manner that the chain saw can be effectively used as a fire fighting tool.

It is, therefore, one object of this invention to provide a new and improved guard for a chain saw.

Another object of this invention is to provide a new and improved guard for a chain saw which provides a bumper which is easily adjustable along the bar of the saw bar to not only selectively expose the nose of the saw but also to provide a sliding ski surface for moving the saw over the exposed surface of a roof.

Another object of this invention is to provide a light weight compact guard for a chain saw which limits the depth to which the saw may be used to cut into a flat surface while still adequately protecting the operator against injury.

A further object of this invention is to provide a chain saw guide which is so designed and constructed that it can be placed over the nose of a saw bar and still be handled by a fire fighter aloft on the roof of a building.

A still further object of this invention is to provide a chain saw guide and as associated chain bar which may be applied to existing and future built chain saws quickly and readily removed therefrom if so desired.

A still further object of this invention is to provide a new and improved chain saw guide and bumper which is simple in construction, safe to use and inexpensive to manufacture.

Further objects and advantages of this invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings in which:

FIG. 11 is a cross sectional view of FIG. 10 taken along the line 11—11;

DESCRIPTION OF THE PREFERRED EMBODIMENTS

Figure 1:
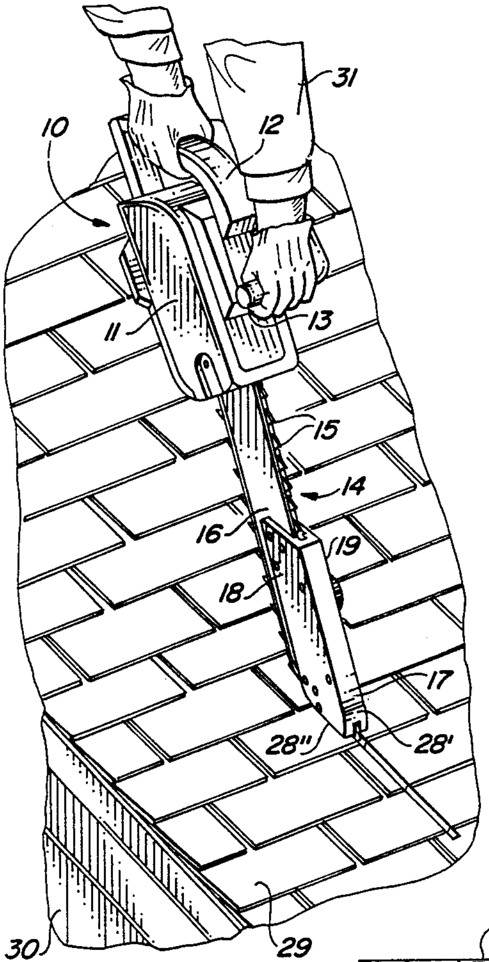
FIG. 1 is a perspective view of a chain saw embodying the chain guard and saw bar disclosed in use by a fireman on the roof of a building.

Referring more particularly to the drawings by characters of reference, FIGS. 1–7 disclose a chain saw 10, comprising a housing 11 containing a driving motor, a rear handle grip on handle 12 and a front or upper handle grip on handle 13 for supporting the chain saw. The motor within the housing drives a sprocket over which runs a continuous chain 14 having saw teeth 15 formed thereon in a known manner. The chain runs over a fixed contoured plate-like guide or saw bar 16 having upper and lower reaches and forward and rear ends, the forward end of which is shaped approximately in a semicircle as shown. The saw bar forms a truncated elliptical shape with the chain straddling and traveling along the longitudinal top and bottom edges of the bar and around its front and rear edges in an endless path.

All of the above structure is known and may take various forms. To this conventional structure the disclosed and claimed guard, guide and bumper structure is added.

This guard, guide and bumper structure comprises an elongated U-shaped member 17, the legs 18 and 19 and interconnecting bight of which are formed to substantially encasing the top and a substantial portion of the sides of the saw bar or guide 16 of the chain saw when it is attached thereto. Guide 16 is provided with a slot 20 extending therethrough and longitudinally thereof for receiving a hand operated clamp 21 comprising a bolt 22 which is arranged to threadedly extend through one leg of the guard and into its other leg for selectively positioning the guard at one of a number of positions along saw bar or guide 16.

Figure 5:
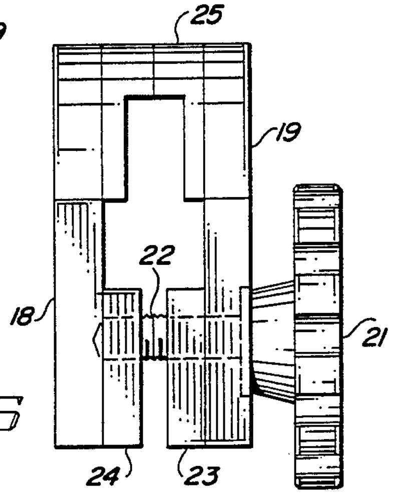
FIG. 5 is a view similar to FIG. 4 taken from the nose end of the saw bar.
Figure 4:
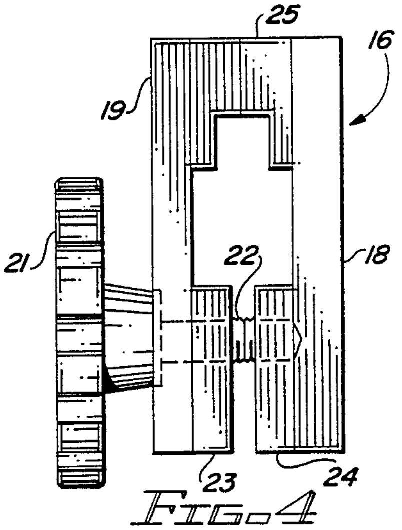
FIG. 4 is a cross sectional view of FIG. 3 taken along the line 4—4.
Figure 6:
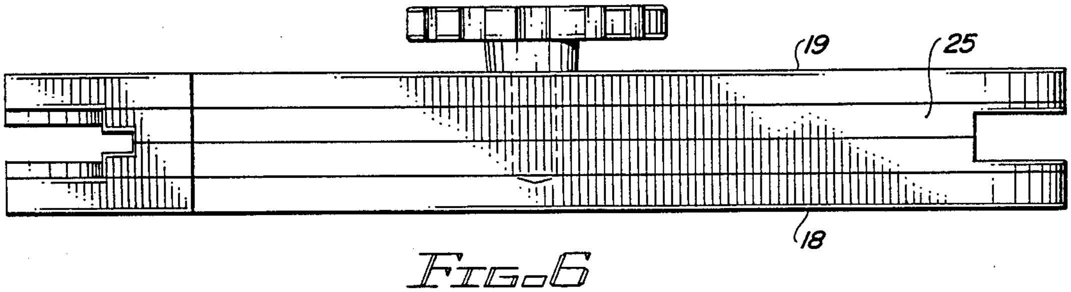
FIG. 6 is a top view of the chain guard shown in FIG. 1.
Figure 7:
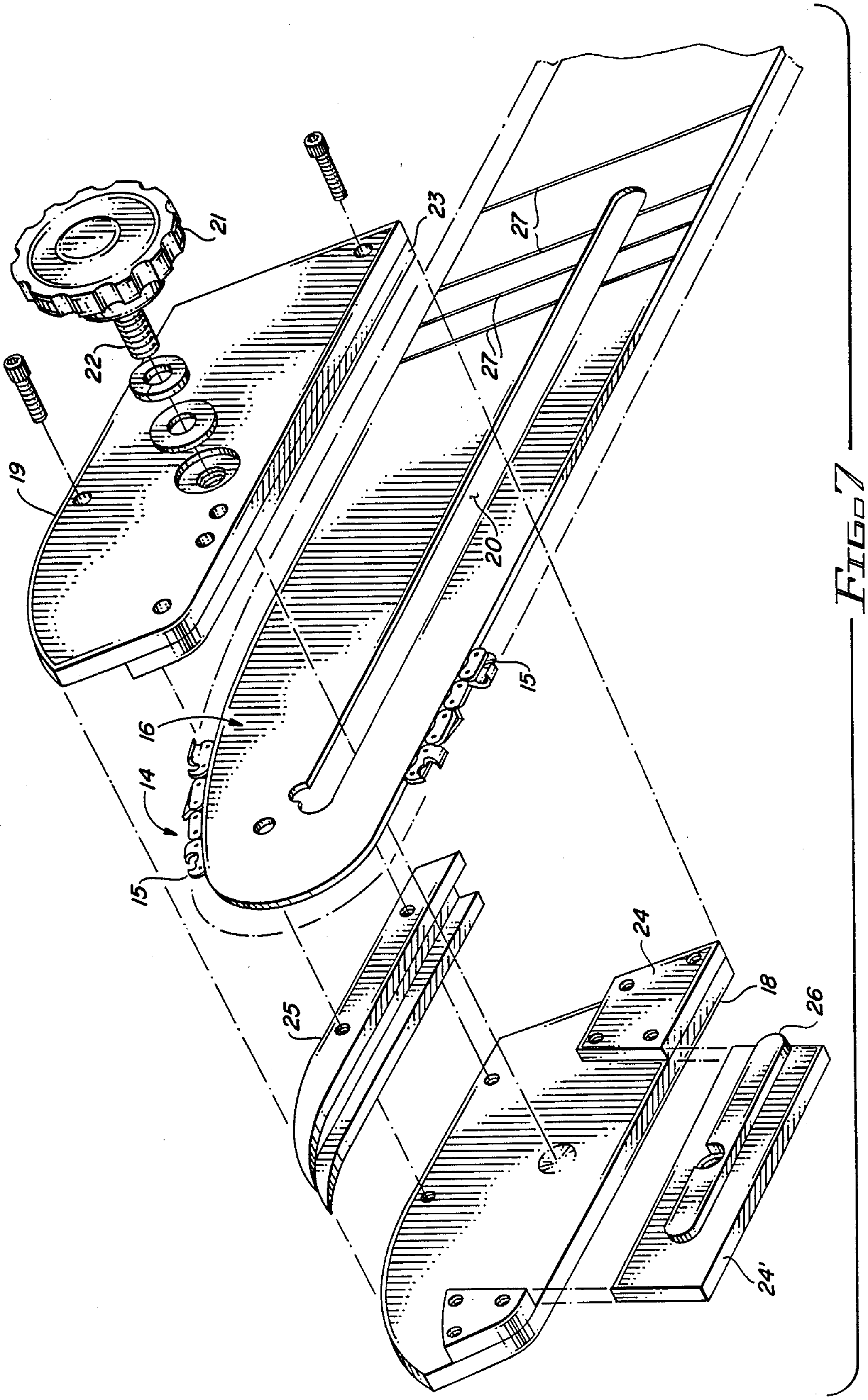
FIG. 7 is an exploded perspective view of the chain guard and saw bar shown in FIG. 1.
Figure 8:
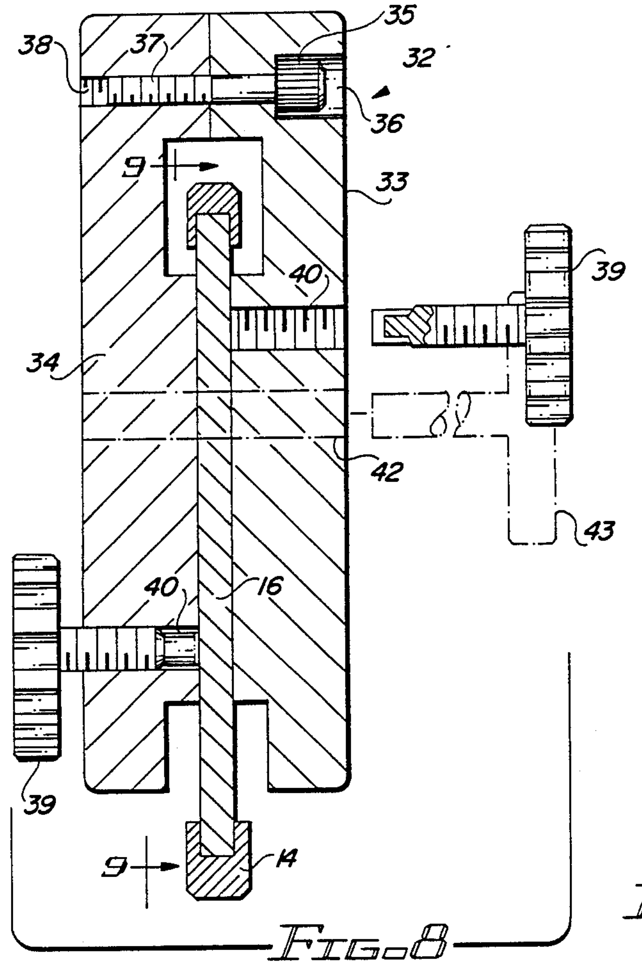
FIG. 8 is a cross sectional exploded view of a modification of the chain guard and saw bar arrangement shown in FIGS. 1–7.
Figure 10:
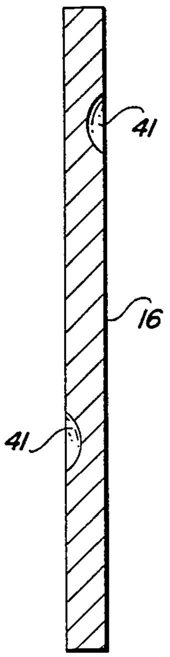
FIG. 10 is a left side view of the saw bar illustrated in FIG. 8 showing a plurality of seats for anchoring the guard at various positions along the saw bar.
Figure 13:
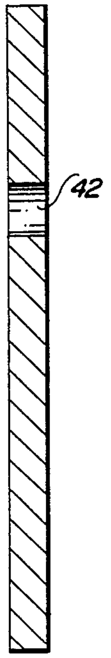
FIG. 13 is a cross sectional view of FIG. 12 taken along the line 13—13.
Figure 9:
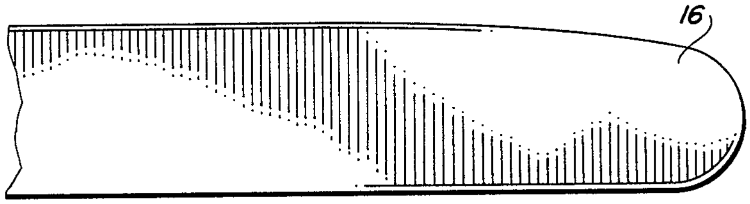
FIG. 9 is a cross sectional view of FIG. 8 taken along the line 9—9.
Figure 10:
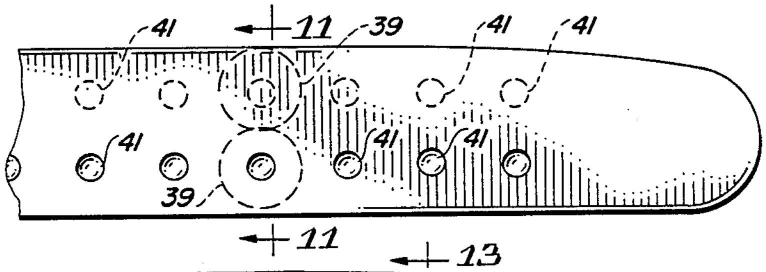
Figure 12:
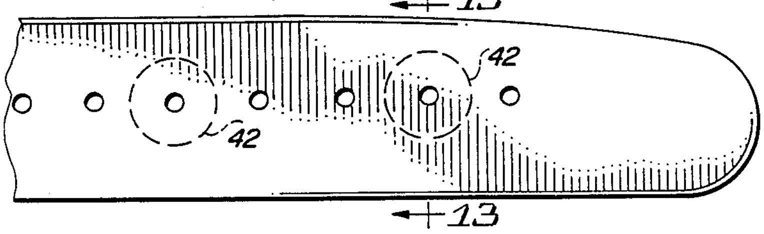
FIG. 12 is a left side view of a further modification of the saw bar shown in FIGS. 8 and 10.

As shown in FIGS. 4, 5 and 7, U-shaped member 17 is provided with a pair of flanges 23 and 24 one of which is attached to each of the juxtapositioned surfaces of legs 18 and 19 at a point adjacent to the nose portion of the guard. These flanges tightly grasps saw bar 16 when positioned therealong and are secured thereto by clamp 21.

Member 17 is further provided with a shallow U-shaped member 25 which when clamped to juxtapositioned surfaces of legs 18 and 19 form its bight.

As noted from FIG. 7, flange 24 comprises a detachable portion 24' which has a collar 26 that is intended to fit into the slot 20 of saw bar 16 so that when member 17 is mounted on saw bar 16 it will firmly engage the saw bar.

Figure 2:
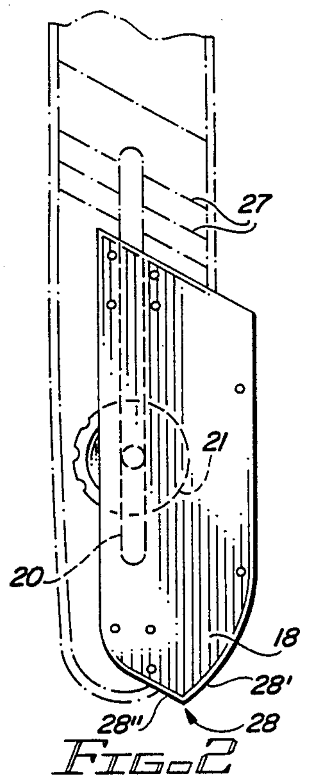
FIG. 2 is an enlarged view of the left side of the chain guard and saw bar shown in FIG. 1.
Figure 3:
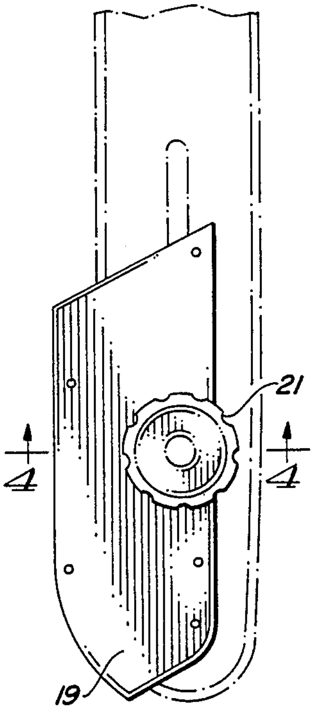
FIG. 3 is a right side view of the chain guard and saw bar shown in FIG. 1.

It should be noted by reference to FIG. 2 that guide or saw bar 16 is provided with marker stripes 27 which may be used in selectively positioning U-shaped member 17 at one of a number of positions along the saw bar.

The U-shaped member 17 is so designed that its nose 28 protects and covers chain 14 on its upper or exposed surface 28' and forms a bumper and guide for engaging the roof surface 29 of a building 30 on its lower surface 28". This is an important feature since when ventilating the attic of a burning building an operator 31 of chain saw 10 must be able to cut through the roofing boards only and not the rafters of the building.

The disclosed guard for a chain saw in the only dual function guard known that covers the nose of the chain bar on its top and selectively exposes the chain bar on the bottom of the bar and provides a ski for guiding the chain saw across the roof of the building at a proper depth.

FIGS. 8–13 illustrate further modification of the guard for the chain saw shown in FIGS. 1–7.

In FIGS. 8–11, a guard, guide and bumper structure 32 is shown comprising two plates or members 33 and 34 which are contoured so as to fit around the guide or saw bar 16 exposing chain 14 and particularly its teeth 15 at the nose end of the saw. These members are held together by two or more bolts 35, the heads of which fits into counter-sunk holes 36 in member 33 and their other ends 37 are threaded into holes 38 in member 34.

Members 33 and 34 are clamped onto saw bar 16 by bolts 39 which threadedly engage with opertures 40 in members 33 and 34, as shown, and tightly engage saw bar 16 one from each side thereof. To aid in anchoring the bolts to the saw bar, the saw bar may be provided with one or more indented seats 41 for selectively positioning the guard 32 along the saw bar.

As a modification of the guard shown in FIGS. 8–12, members 33 and 34 are provided with a pair of opertures 42 extending therethrough into which a bolt 43 (shown in dash lines in FIG. 8) is threadedly engaged for tightly mounting the guard on the saw bar.

Although but a few embodiments of the invention have been shown and described, it will be apparent to those skilled in the art that various changes and modification may be made therein without departing from the spirit of the invention or from the scope of the appended claims.

What is claimed is:

1. A guard mechanism for a chain saw having a contoured plate which defines a path over which a continuous saw chain is driven along upper and lower reaches and between forward and rearward ends of said plate, said guard mechanism comprising a U-shaped channel member having a pair of spaced legs which project around at least a first part of the forward end of said plate and a bight disposed over and covering said saw chain along at least a part of the upper reaches of said plate, a second part of said forward end of said guard mechanism exposing a forward cutting edge of an associated saw chain and forming a ski for guiding the saw chain along a surface to be cut, and means for adjustably positioning said guard mechanism along the length of said plate to selectively control the amount of exposure of said cutting edge of said saw chain.

2. The guard mechanism set forth in claim 1 wherein:

said contoured plate has a slot extending longitudinally therethrough, and said means comprises a bolt extending through one leg of said channel member, said slot and into the other leg of said channel for fixedly securing said guard mechanism to said plate.

3. The guard mechanism set forth in claim 2 in further combination with:

marker lines parallelly positioned at a predetermined position along the length of said plate for selectively positioning said guard mechanism on said plate.

4. The guard mechanism set forth in claim 2 wherein:

said bolt threadedly engages said other of said legs of said channel.

5. The guard mechanism set forth in claim 2 wherein:

said bight of said U-shaped members covers at least a part of the upper reaches of the saw chain path.

6. The guard mechanism set forth in claim 1 wherein:

the forward edges of said U-shaped member form said ski for guiding the chain saw.

* * * * *